(12) United States Patent
Chen

(10) Patent No.: US 7,654,293 B2
(45) Date of Patent: Feb. 2, 2010

(54) TREE PRUNERS

(76) Inventor: Pao-Lu Chen, 5F., No. 10, Lane 46, Sinren 7th St., Dali City, Taichung County 412 (TW)

( * ) Notice: Subject to any disclaimer, the term of this patent is extended or adjusted under 35 U.S.C. 154(b) by 209 days.

(21) Appl. No.: 11/878,633

(22) Filed: Jul. 25, 2007

(65) Prior Publication Data

US 2009/0025828 A1    Jan. 29, 2009

(51) Int. Cl.
*A01G 23/087* (2006.01)
*B26B 19/00* (2006.01)

(52) U.S. Cl. .................. 144/34.5; 30/246; 30/249

(58) Field of Classification Search .......... 144/34.5, 144/208.92; 30/244–246, 249, 296.1; 56/332, 56/333, 335; D8/4, 5, 7
See application file for complete search history.

(56) References Cited

U.S. PATENT DOCUMENTS

| | | | | |
|---|---|---|---|---|
| 5,745,998 A | * | 5/1998 | Le et al. | 30/249 |
| 6,038,773 A | * | 3/2000 | Le et al. | 30/249 |
| 6,178,644 B1 | * | 1/2001 | Le et al. | 30/249 |
| 6,526,664 B2 | * | 3/2003 | Cech | 30/249 |
| 2007/0119057 A1 | * | 5/2007 | Chen | 30/249 |

* cited by examiner

*Primary Examiner*—Shelley Self
(74) *Attorney, Agent, or Firm*—Wang Law Firm, Inc.; Li K. Wang

(57) ABSTRACT

A tree pruner includes a rod and a fixed part is fixed to the rod and an arm has a first end pivotably connected to the fixed part. A spring is connected between the fixed part and a second end of the arm. A movable part has an end fixed to the arm and a mediate portion of the movable part is pivotably connected to the fixed part. A positioning seat is movably positioned on the rod and a stationary pulley is connected to the positioning seat. A movable pulley is connected to the arm and a rope reeves through the stationary pulley and the movable pulley. When pulling the rope, the arm is pivoted to move the movable part toward the fixed part to prune branches when the arm is pivoted.

6 Claims, 12 Drawing Sheets

TREE PRUNERS

FIELD OF THE INVENTION

The present invention relates to a tree pruner wherein the position of the stationary pulley is adjustable along the rod so as to save effort when operating.

BACKGROUND OF THE INVENTION

A conventional tree is pruner shown in FIGS. 9 and 10, and generally includes rod 81 with a fixed part 82 connected to a top thereof and the fixed part 82 includes an extension which has a fixed edge 821. An arm 84 has a first end pivotably connected to the fixed part 82 and a movable part 83 has one end connected to the arm 84. The mediate portion is pivotably connected to the fixed part 82 and the movable part 83 includes a movable edge 831. A spring 85 is connected between a second end of the arm 84 and the fixed part 82. A stationary pulley 87 is connected to the rod 81 and located close to the fixed part 82 and a movable pulley 86 is connected the second end of the arm 84. A rope 88 has one end fixed to the pulley frame for the movable pulley 86 and the other end of the rope 88 reeves the fixed pulley 87 and the movable pulley 86 so that the user can pull the second end of the rope 88 as shown in FIG. 13 to pivot the arm 84 relative to the fixed part 82 and the movable part 83 is pivoted so that the movable edge 831 moves toward the fixed edge 821 to cut branches between the fixed edge 821 and the movable edge 831.

The fixed pulley 87 is located close to the arm 84 so that when operating the tree pruner, the angle "θ" between the line connected between the fixed pulley 87 and the movable pulley 86 and the rope 88 in vertical direction changes a lot. This requires more force "Fa" to pull the rope 88 and is inconvenient for some users.

The present invention intends to provide a tree pruner wherein the angle between the line connected between the fixed pulley and the movable pulley and the rope in vertical direction changes a small angle when operating the pruner so that the user simply applies a small force to prune the branches of trees.

SUMMARY OF THE INVENTION

The present invention relates to a tree pruner which comprises a rod and a fixed part has one end fixed to the rod and an arm has a first end pivotably connected to the fixed part. A spring is connected between the fixed part and a second end of the arm. A movable part has an end fixed to the arm and a mediate portion of the movable part pivotably connected to the fixed part. A movable edge is defined in a side of the other end of the movable part so as to be movable toward a fixed edge on the fixed part to prune branches.

A positioning seat is movably positioned on the rod and includes a first end with a through hole defined therethrough, the rod extends through the through hole. A stationary pulley is connected to a second end of the positioning seat and a pulley frame is connected to the second end of the arm. A movable pulley is connected to the pulley frame. A rope has a fixed end fixed to the pulley frame and a pulling end of the rope reeves through the stationary pulley and the movable pulley.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
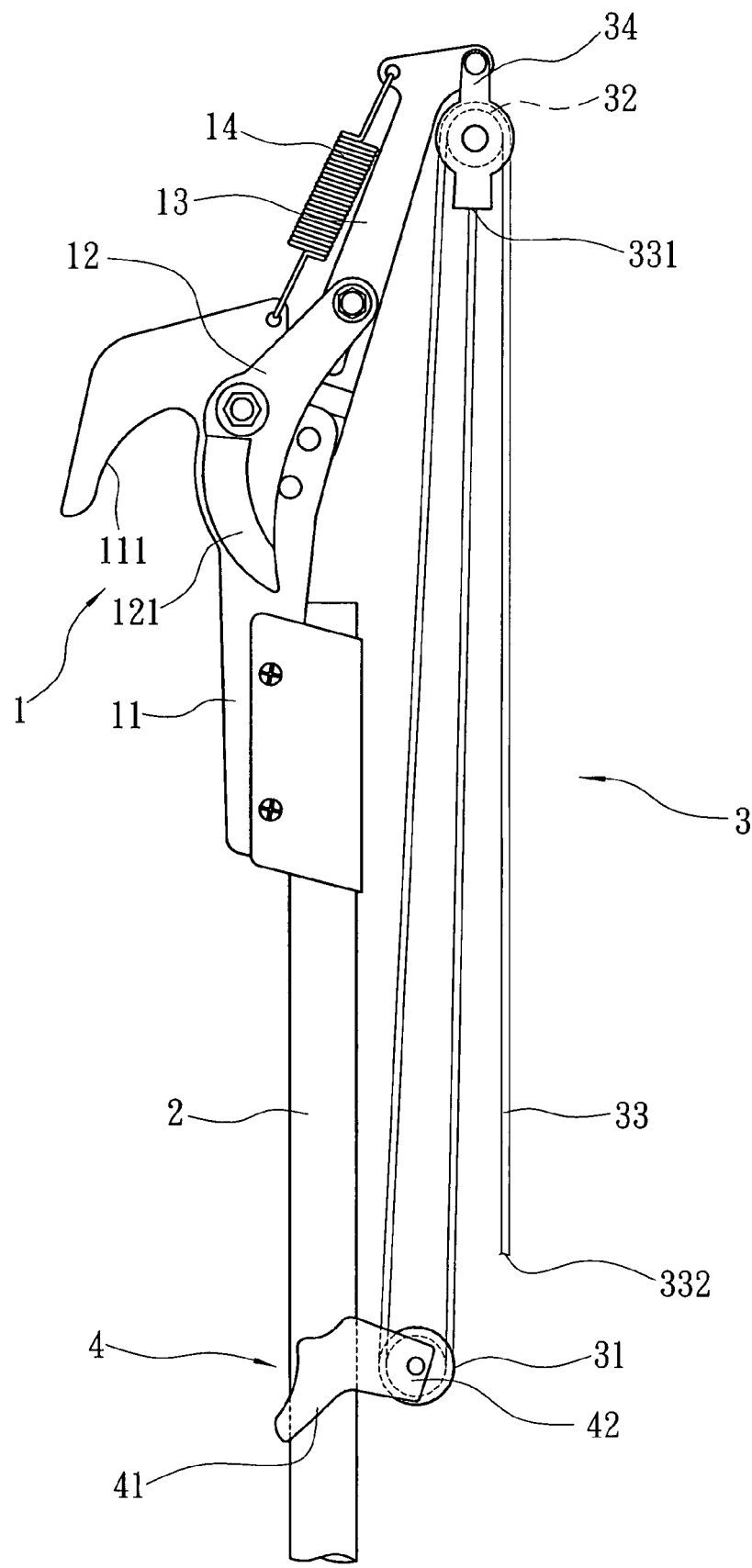
FIG. 1 is a side view to show the tree pruner of the present invention.
Figure 2:
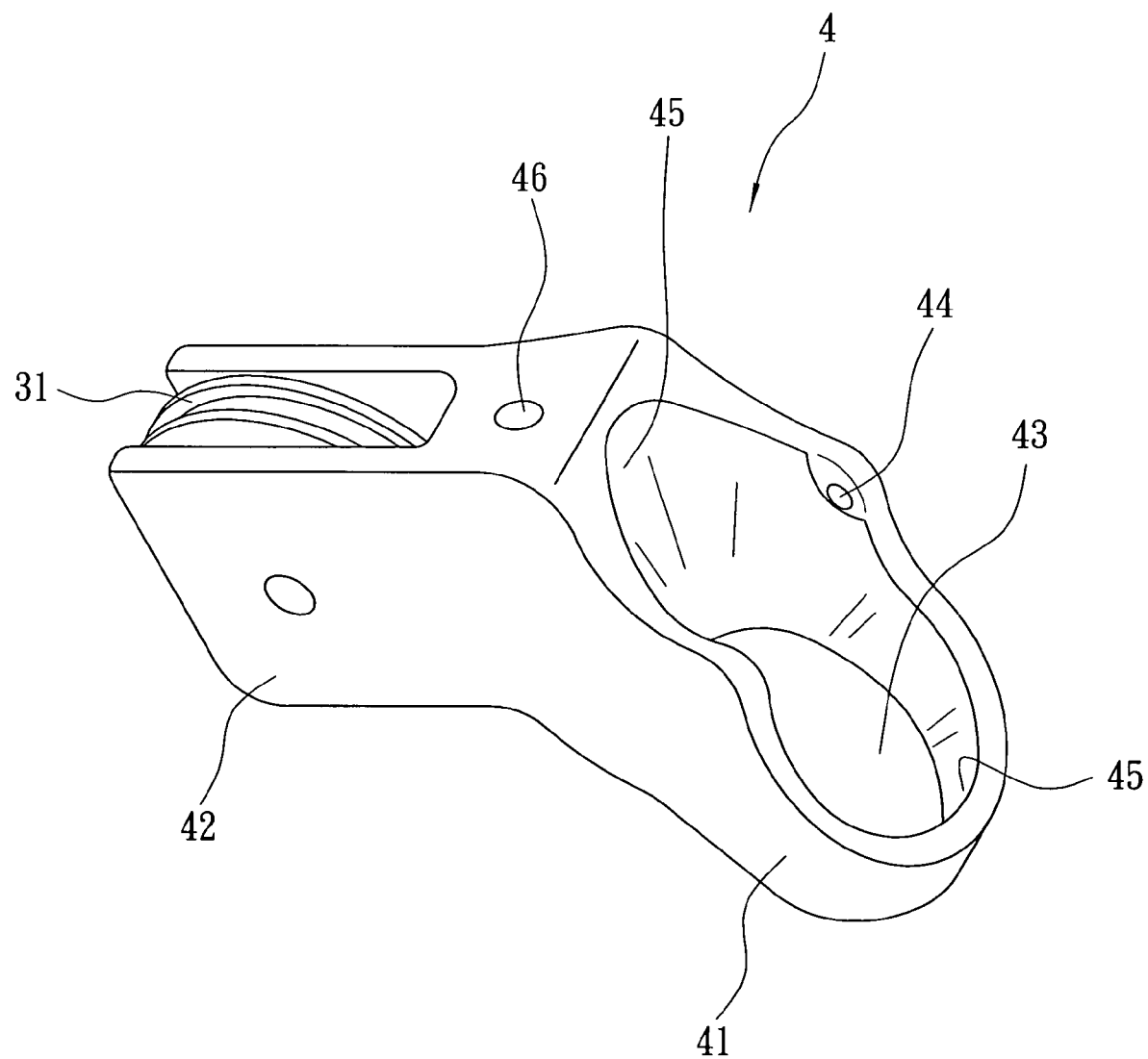
FIG. 2 is a perspective view to show the positioning seat of the present invention.
Figure 3:
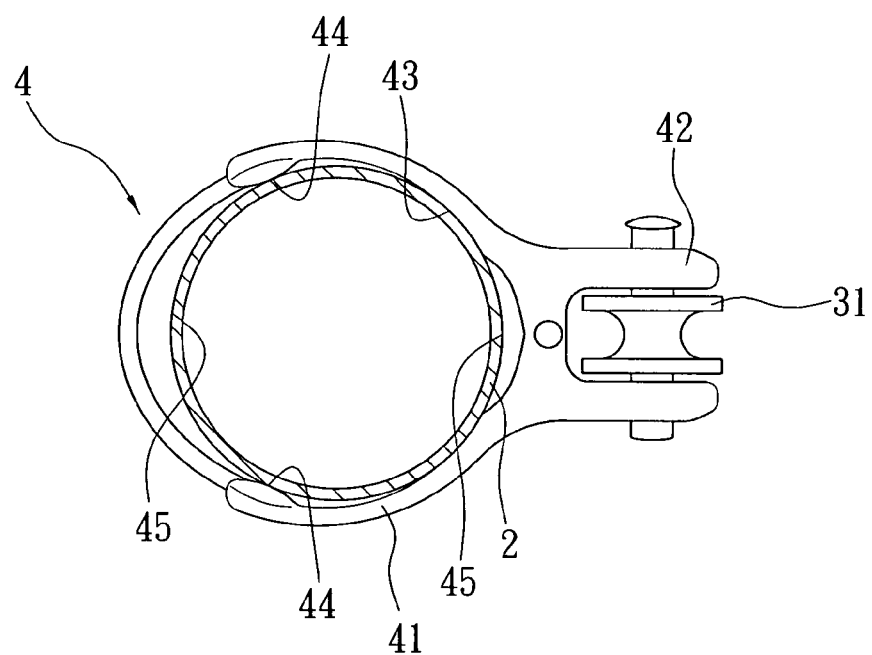
FIG. 3 is a top view to show the rod is in contact with one of the inside walls of the positioning seat.

Referring to FIGS. 1 to 3, the tree pruner of the present invention comprises a rod 2 having a pruning unit 1 connected to a top thereof and the pruning unit 1 comprises a fixed part 11 which has one end fixed to the rod 2 and an arm 13 has a first end pivotably connected to the fixed part 11. An extension extends laterally from the fixed part 11 and includes a fixed edge 111. A spring 14 is connected between the fixed part 11 and a second end of the arm 13. A movable part 12 has an end fixed to the arm 13 and a mediate portion of the movable part 12 is pivotably connected to the fixed part 11. A movable edge 121 is defined in a side of the other end of the movable part 12 and movable toward the fixed edge 111 when the arm 13 is pivoted downward.

Figure 6:
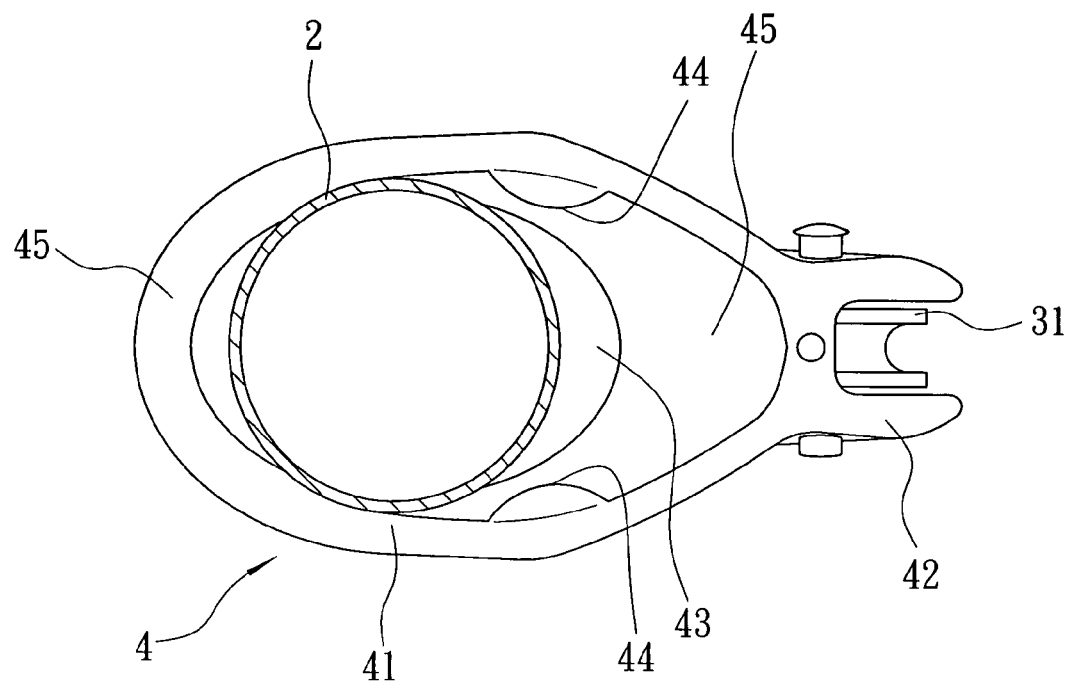
FIG. 6 is a top view to show the rod is in contact with the other one of the inside walls of the positioning seat.
Figure 5:
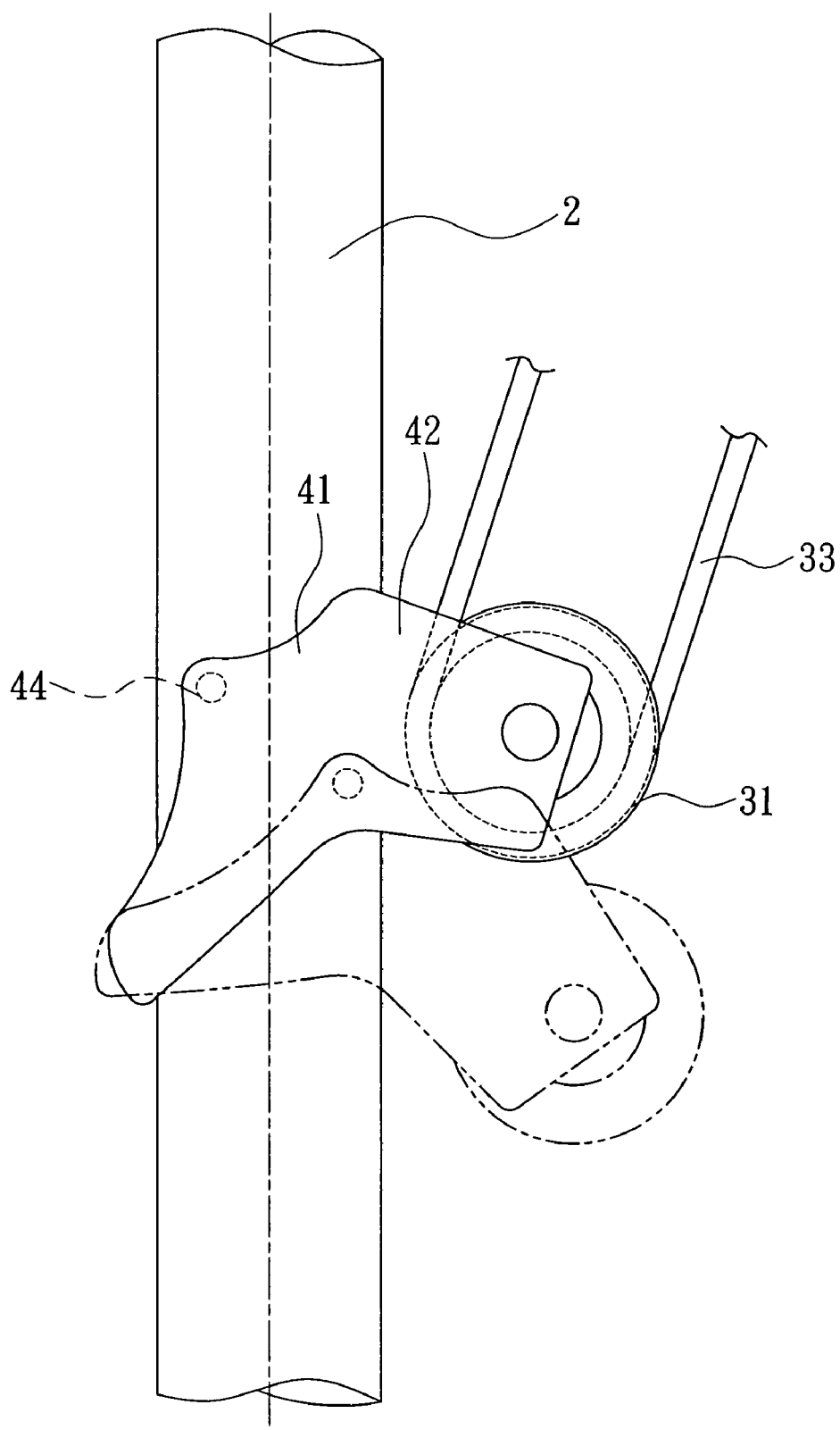
FIG. 5 shows the positioning seat is pivoted on the rod.

A positioning seat 4 is movably positioned on the rod 2 and includes a first end 41 with a substantial oval-shaped recessed area defined therein and a through hole 43 is defined through the positioning seat 4. The through hole 43 communicates with the substantial oval-shaped recessed area. The rod 2 extends through the through hole 43. The substantial oval-shaped recessed area includes two inside walls 45 located at two ends of a long axis thereof and the substantial oval-shaped recessed area is larger than a diameter of the rod 2 so that the two inside walls 45 are respectively in contact with the rod 2 when pivoting the positioning seat 4 relative to the rod 2 as shown in FIGS. 3, 5 and 6. Two protrusions 44 extend inward from two facing insides of the substantial oval-shaped recessed area and a distance between the two protrusions 44 is shorter than the diameter of the rod 2. Therefore, the rod 2 is positioned by the protrusions 44 and does not shake within the substantial oval-shaped recessed area when the positioning seat 4 is positioned at the position as shown by phantom lines in FIG. 5.

A pulley unit 3 includes a stationary pulley 31 connected to a second end of the positioning seat 4 and a pulley frame 34 is connected to the second end of the arm 13. A movable pulley 32 is connected to the pulley frame 34. A rope 33 has a fixed end 331 fixed to the pulley frame 34 and a pulling end 332 of the rope 33 reeves through the stationary pulley 31 and extends through a passage 46 defined through the positioning seat 4 and located between the first end 41 and the second end 42 of the positioning seat 4, and then reeves through the movable pulley 32. The pulling end 332 of the rope 33 is hanging vertically and ready for being pulled.

Figure 4:
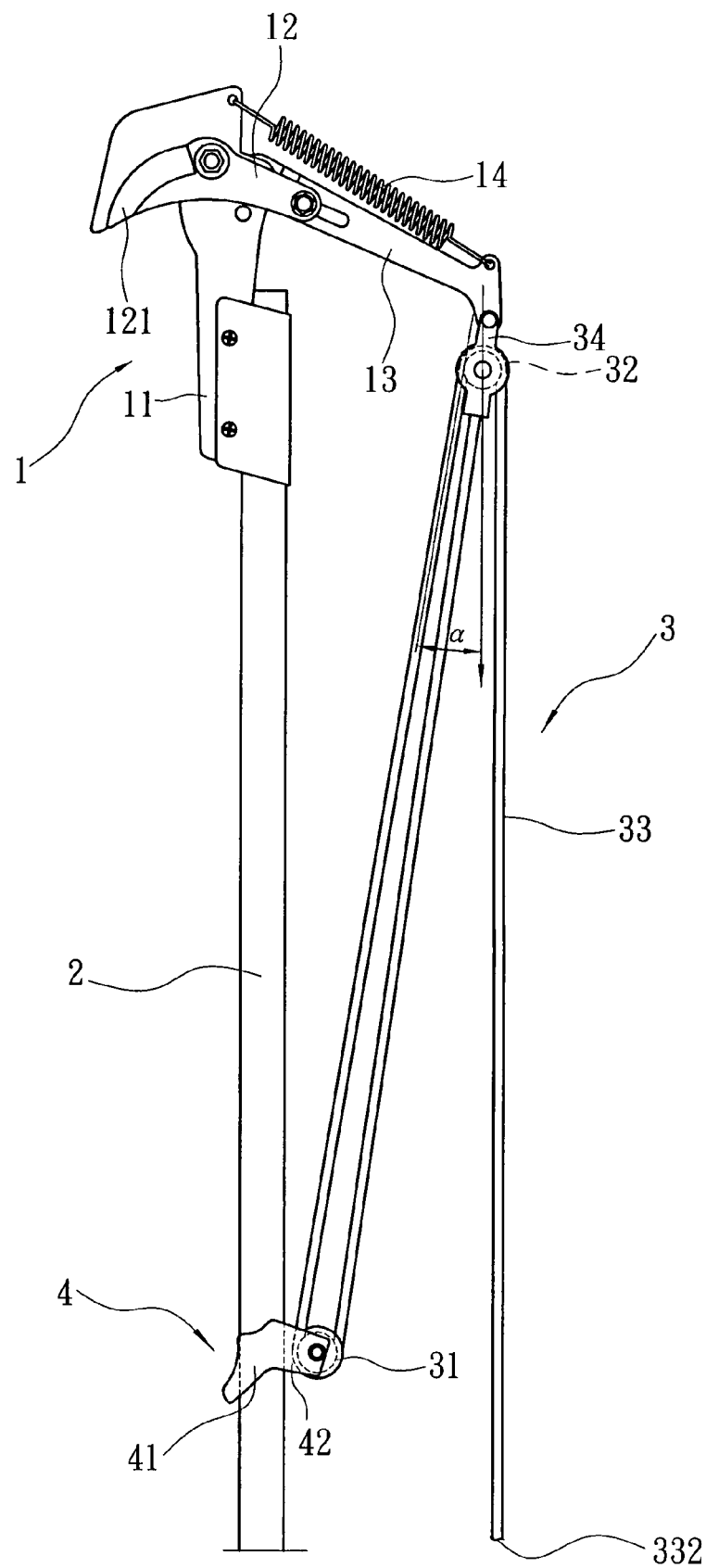
FIG. 4 is a side view to show the arm is pivoted by pulling the rope.
Figure 13:
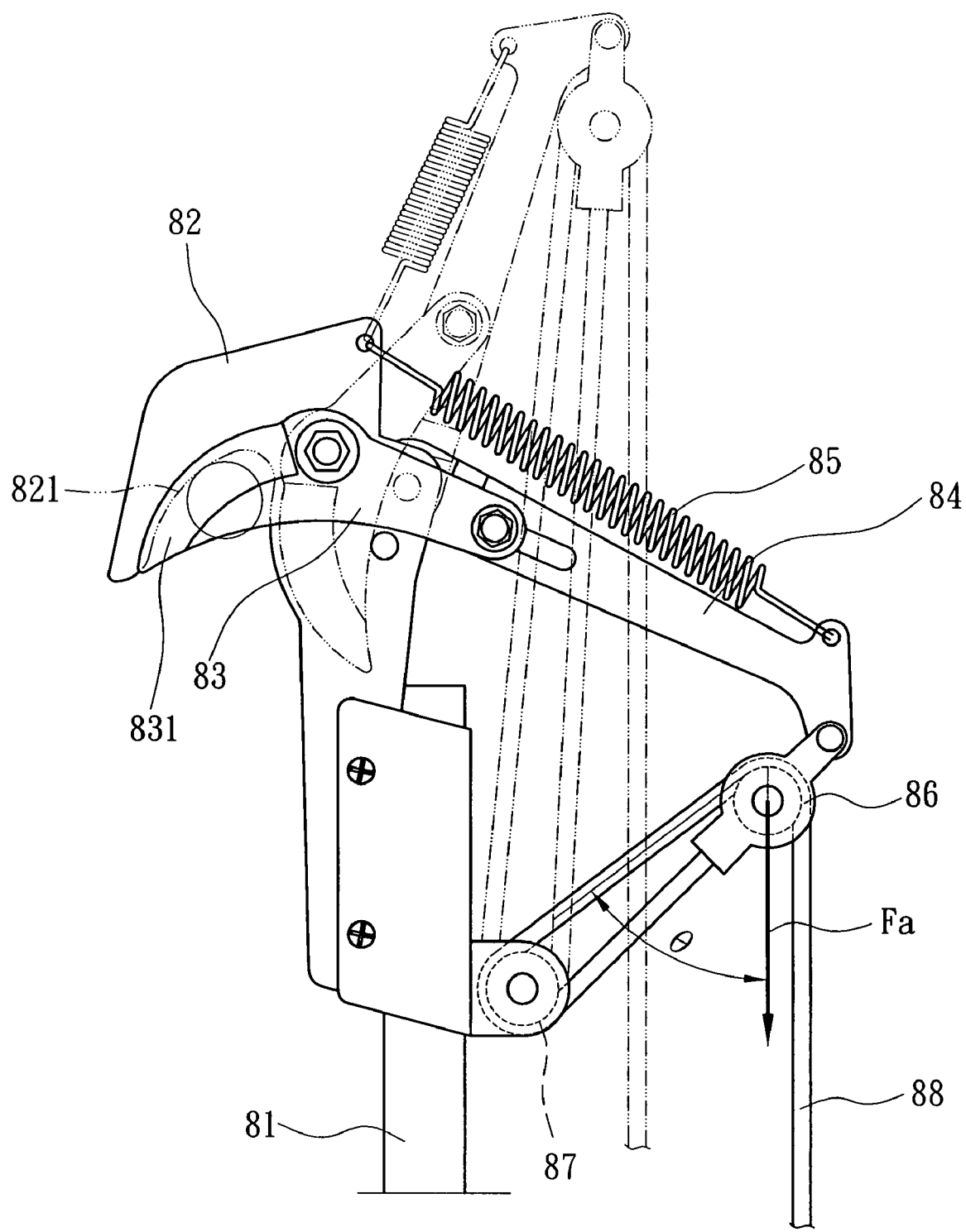
FIG. 13 shows the operation of the conventional tree pruner.

As shown in FIG. 4, when pulling the pulling end 332 of the rope 33, the arm 13 is pivoted about the first end thereof and the movable pulley 32 is lowered. The movable part 12 is pivoted about the mediate portion thereof so that the movable edge 121 moves toward the fixed edge 111 to prune branches between the movable edge 121 and the fixed edge 111. It is noted that the angle "a" defined between a line between the movable pulley 32 and the stationary pulley 31, and the rope 33 in vertical direction is much smaller than the angle "θ" as described in FIG. 13. The user simply applies a small force to operate the tree pruner.

Figure 7:
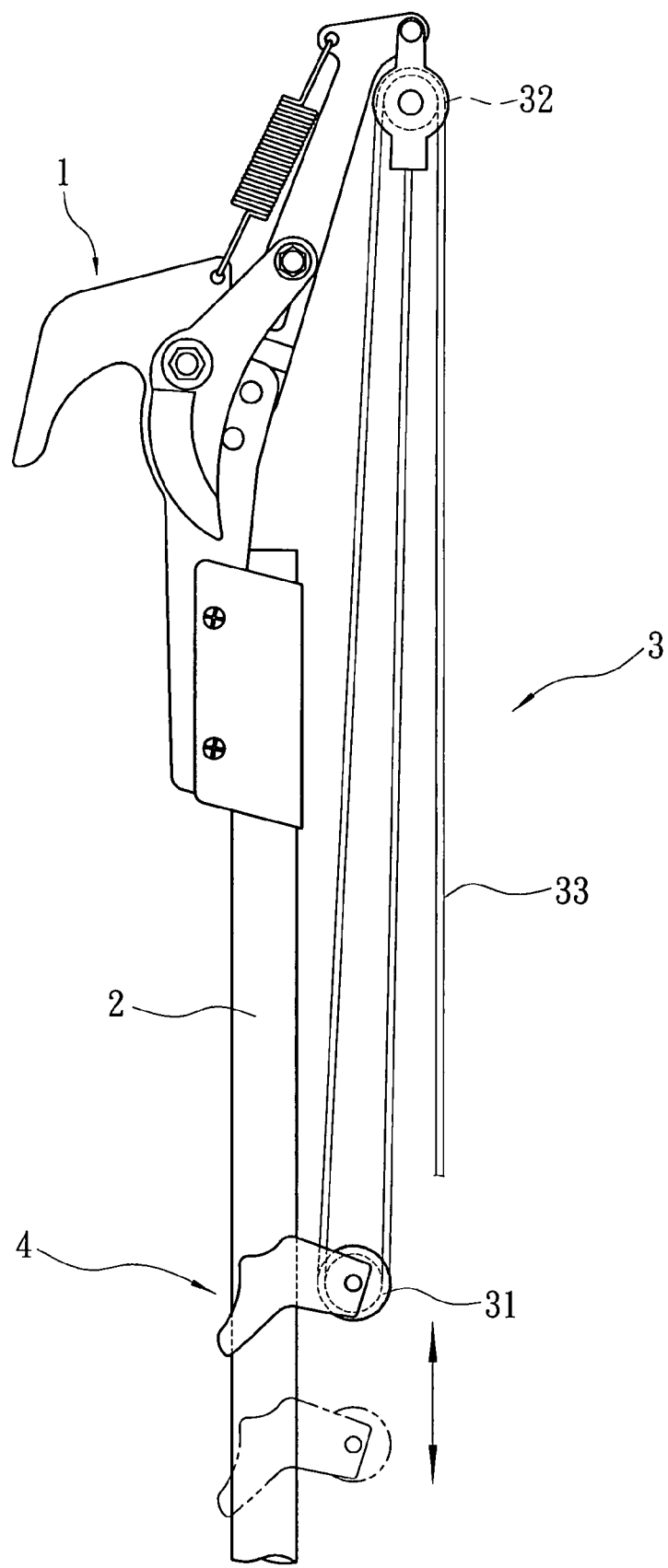
FIG. 7 shows the positioning seat is moved along the rod.

As shown in FIGS. 5 and 7, the position of the stationary pulley 31 can be adjusted by moving the positioning seat 4. When the positioning seat 4 is pivoted upward as shown by the solid line in FIG. 5 and the rod 2 is in contact with the inside wall 45 as shown in FIG. 3, the two protrusions 44 are moved to left side of the axis of the rod 2, the rod 2 can be moved in the through hole 43 so that the positioning seat 4 can be moved along the rod 2.

Figure 8:
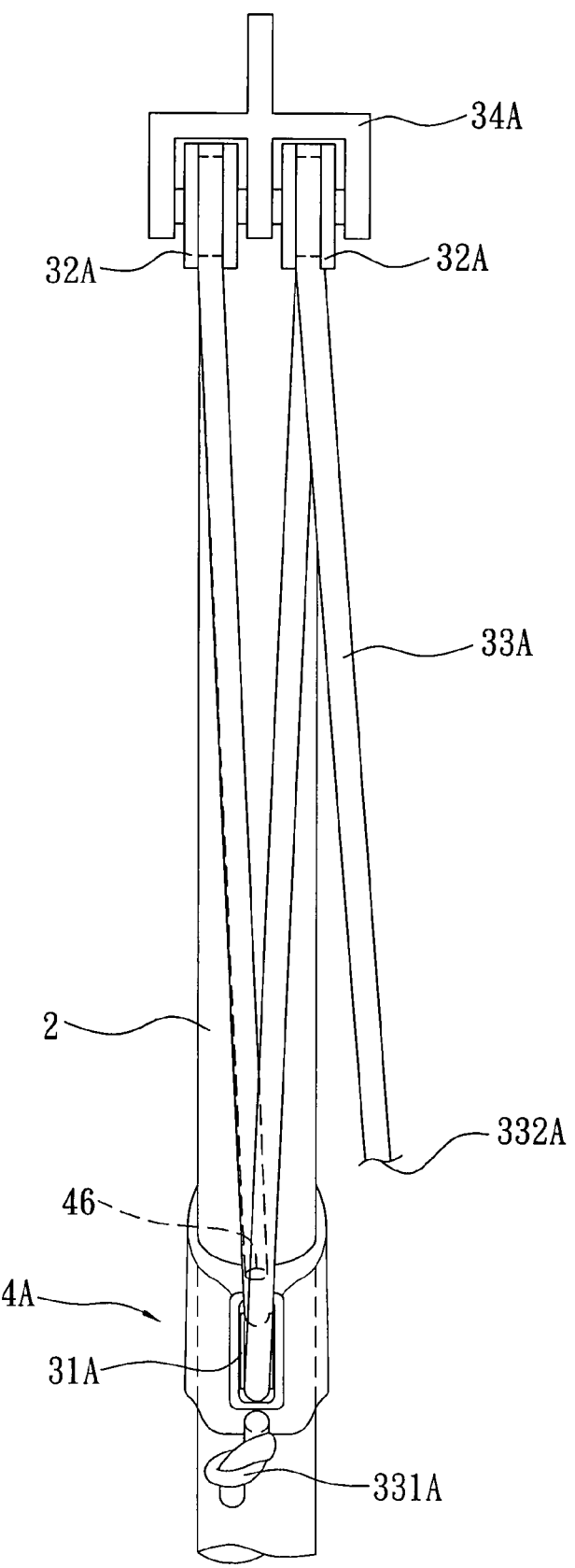
FIG. 8 shows another embodiment of the pulley unit.
Figure 9:
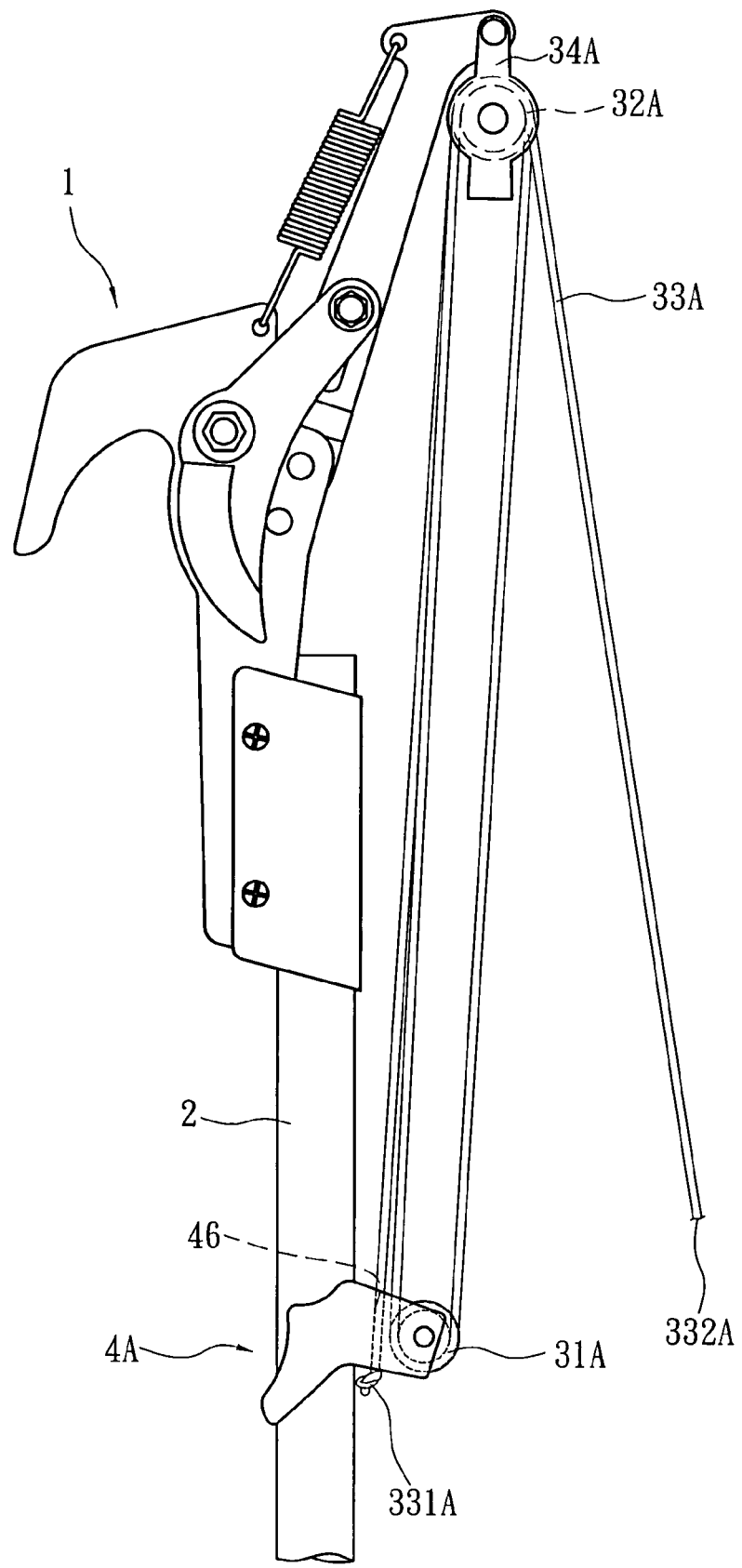
FIG. 9 is a side view to show the tree pruner with the pulley unit in FIG. 8.

FIGS. 8 and 9 show another embodiment of the pulley unit which includes two movable pulleys 32A connected to the pulley frame 34A and the fixed end 331A of the rope 33A is fixed to the positioning seat 4A. The pulling end 332A extends through the passage 46 in the positioning seat 4A and then reeves one of the two movable pulleys 32A, the stationary pulley 31A and the other movable pulley 32A.

Figure 10:
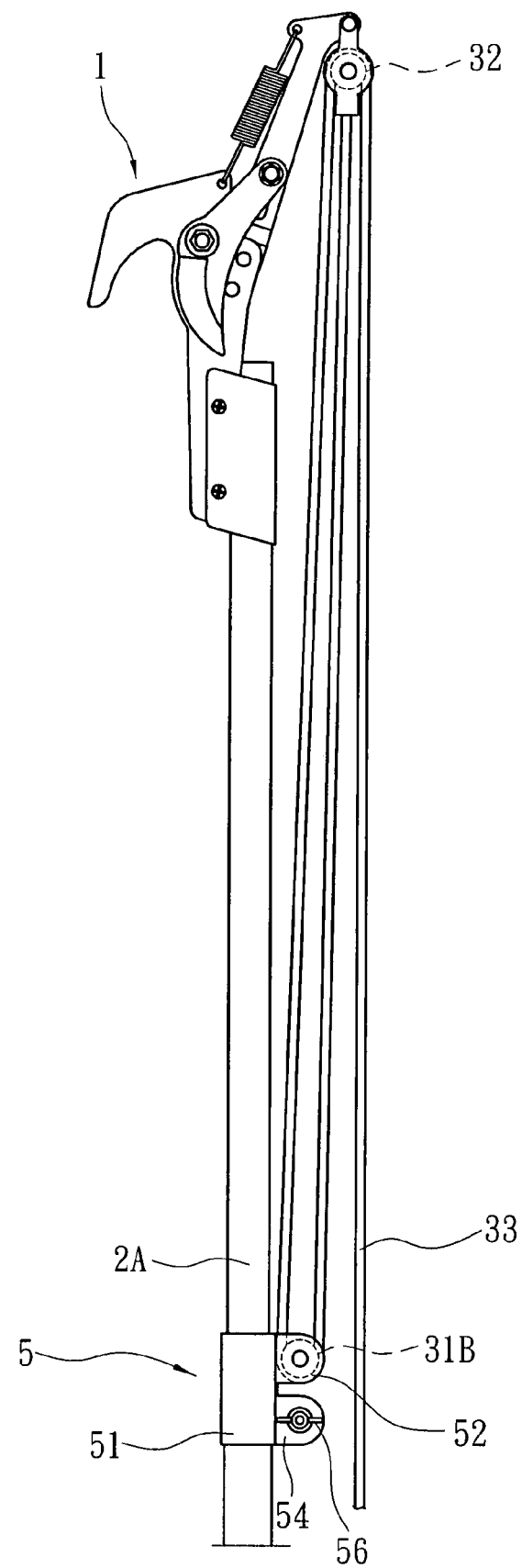
FIG. 10 shows another embodiment of the positioning seat.
Figure 11:
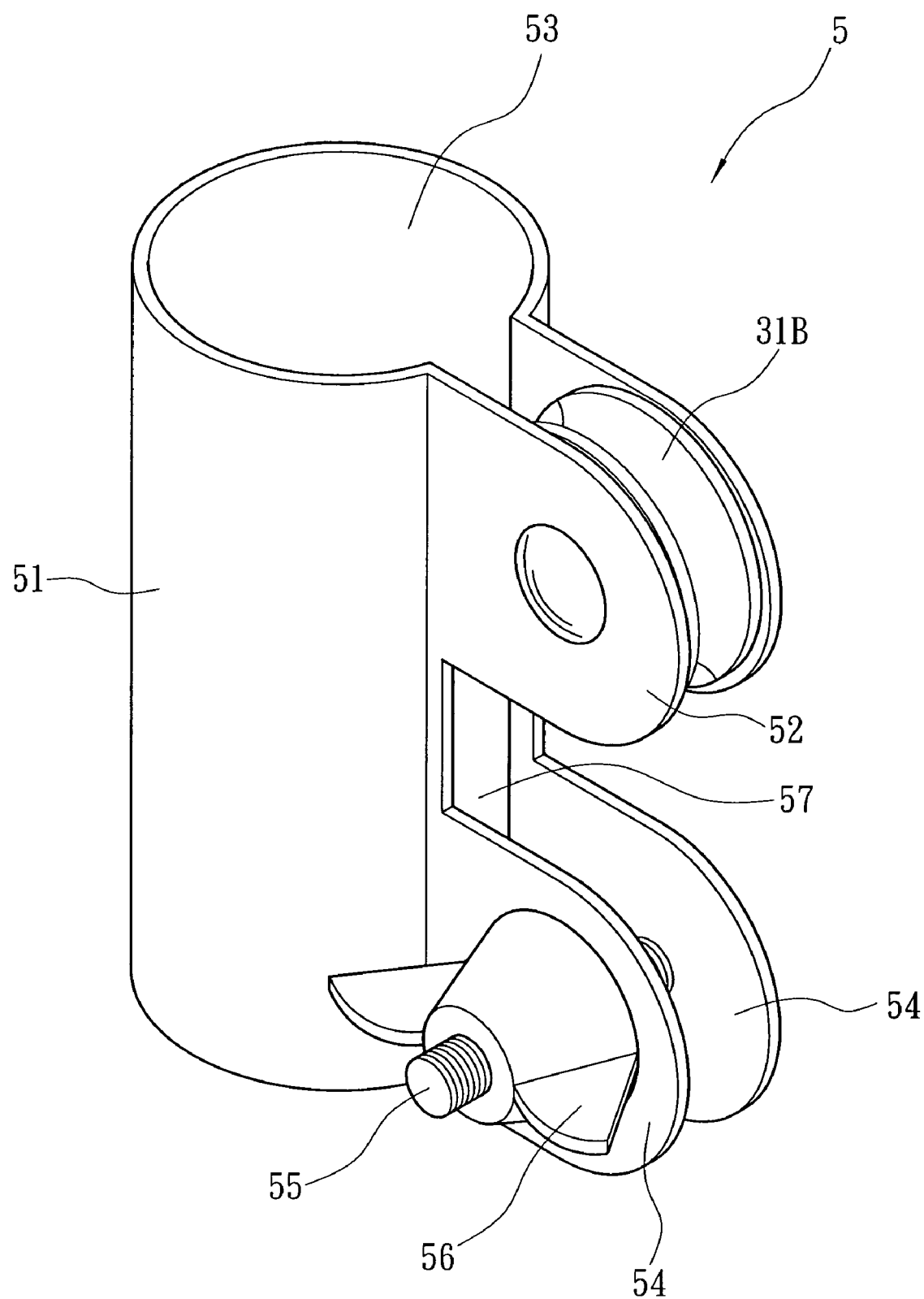
FIG. 11 is a perspective view to show the positioning seat in FIG. 10.
Figure 12:
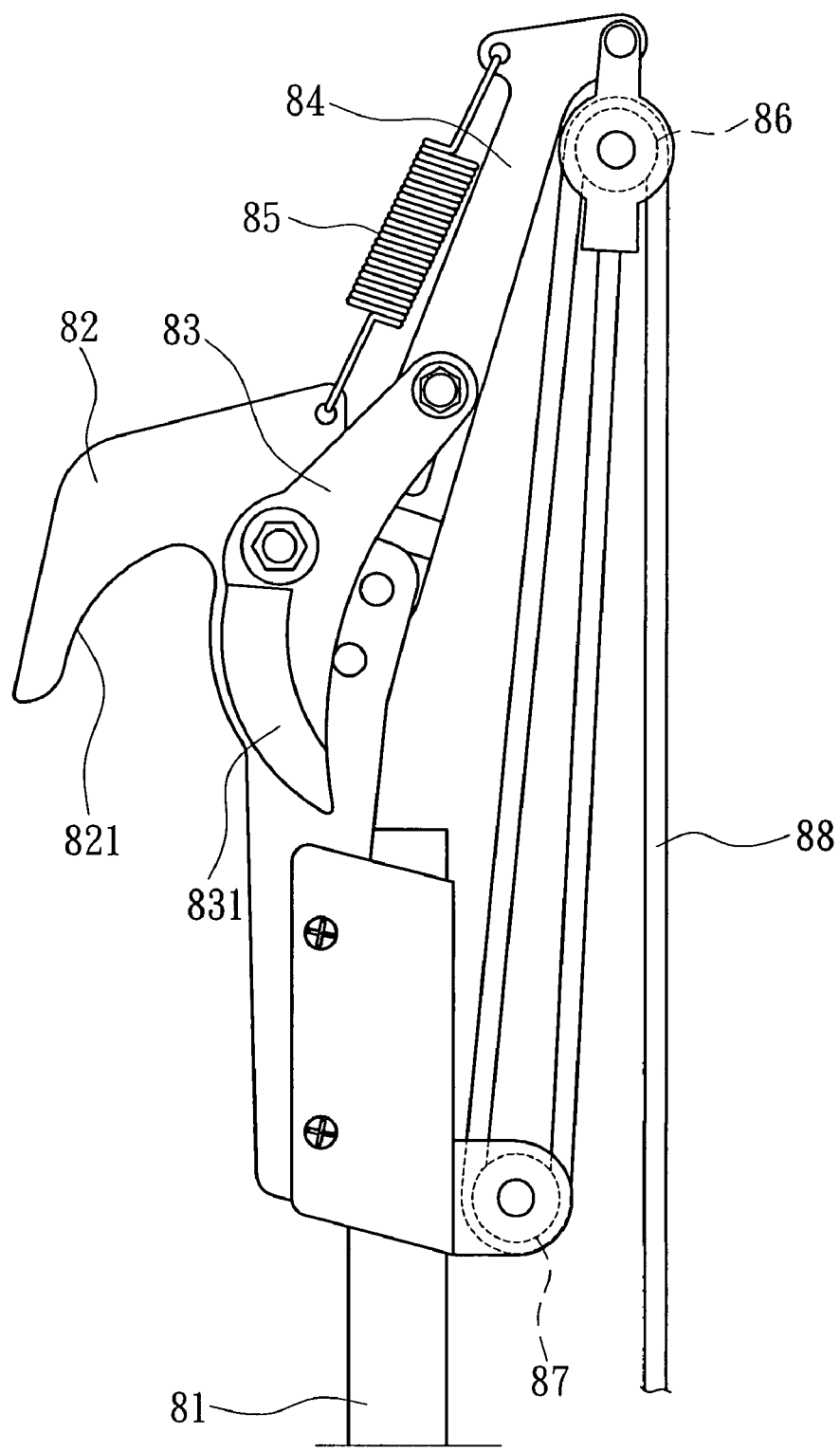
FIG. 12 is a side view to show the conventional tree pruner.

FIGS. 10 and 11 show another embodiment of the positioning seat 5 which is a tubular member 51 with the through hole 53 defined longitudinally therethrough. Two first lugs 52 extend radially from the tubular member 51 and the stationary pulley 31B is connected between the two first lugs 52. Two second lugs 54 extend radially from the tubular member 51 and a split groove 57 is defined through a wall of the tubular member 51. The split groove 57 is located between the two second lugs 54, a fastening member 55 extends through the second lugs 54 to secure the positioning seat 5 on the rod 2A in the through hole 53. The fastening member 55 is a bolt and a butterfly nut 56 is connected to the bolt.

While we have shown and described the embodiment in accordance with the present invention, it should be clear to those skilled in the art that further embodiments may be made without departing from the scope of the present invention.

What is claimed is:

1. A tree pruner comprising:
a rod having a pruning unit connected to a top thereof and the pruning unit comprising a fixed part which has one end fixed to the rod and an arm having a first end pivotably connected to the fixed part, an extension extending laterally from the fixed part and including a fixed edge, a spring connected between the fixed part and a second end of the arm, a movable part having an end fixed to the arm and a mediate portion of the movable part pivotably connected to the fixed part, a movable edge defined in a side of the other end of the movable part and movable toward the fixed edge when the arm is pivoted;
a positioning seat movably positioned on the rod and including a first end with a through hole defined therethrough, the rod extending through the through hole, and
a pulley unit including a stationary pulley connected to a second end of the positioning seat and a pulley frame connected to the second end of the arm, a movable pulley connected to the pulley frame, a rope reeving the movable pulley frame and the stationary pulley.

2. The tree pruner as claimed in claim 1, wherein the positioning seat includes a substantial oval-shaped recessed area and the through hole communicates with the substantial oval-shaped recessed area, the substantial oval-shaped recessed area includes two inside walls located at two ends of a long axis of the substantial oval-shaped recessed area and the substantial oval-shaped recessed area is larger than a diameter of the rod so that the two inside walls are respectively in contact with the rod when pivoting the positioning seat relative to the rod.

3. The tree pruner as claimed in claim 2, wherein two protrusions extend inward from two facing insides of the substantial oval-shaped recessed area and a distance between the two protrusions is shorter than the diameter of the rod.

4. The tree pruner as claimed in claim 1, wherein a passage is defined through the positioning seat and located between the first end and the second end of the positioning seat, the rope extends through the passage.

5. The tree pruner as claimed in claim 1, wherein the positioning seat is a tubular member with the through hole defined longitudinally therethrough, two first lugs extend radially from the tubular member and the stationary pulley is connected between the two first lugs, two second lugs extend radially from the tubular member and a split groove is defined through a wall of the tubular member, the split groove is located between the two second lugs, a fastening member extends through the second lugs to secure the positioning seat on the rod.

6. The tree pruner as claimed in claim 5, wherein the fastening member is a bolt and a butterfly nut is connected to the bolt.

* * * * *